3,605,744
INJECTION APPARATUS AND METHOD OF
INJECTING
Edward M. Dwyer, 53 Church St., Plymouth, Pa. 18651
Filed Apr. 22, 1969, Ser. No. 818,237
Int. Cl. A61m 5/20
U.S. Cl. 128—218F                                    15 Claims

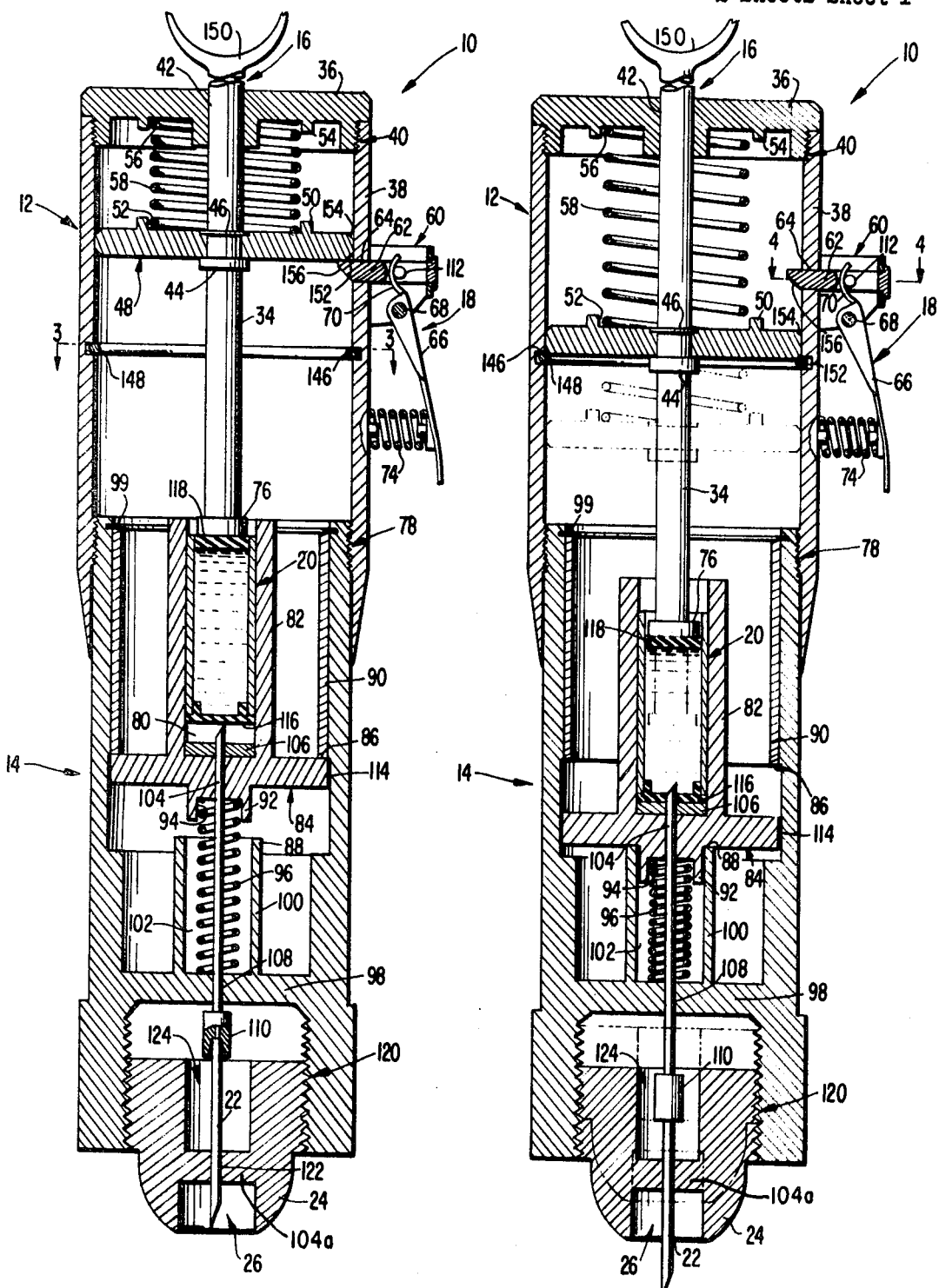

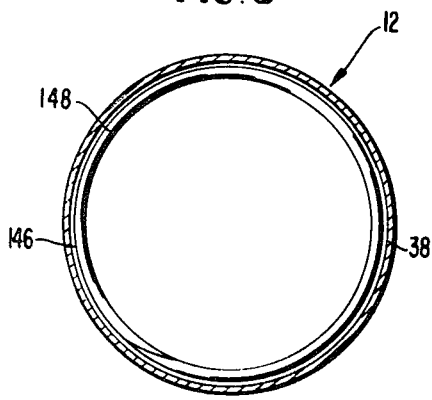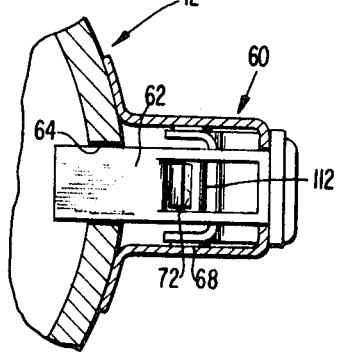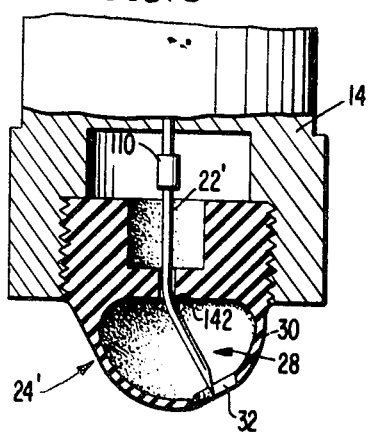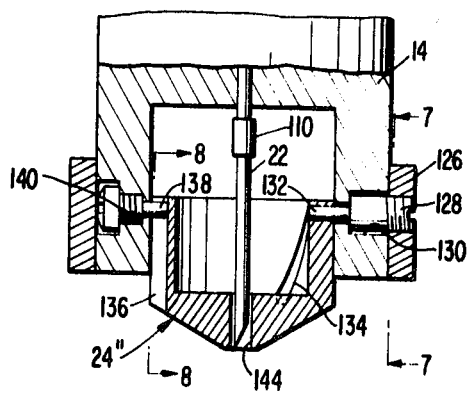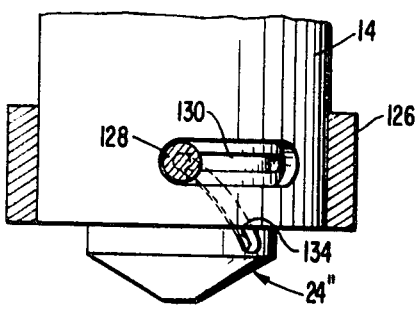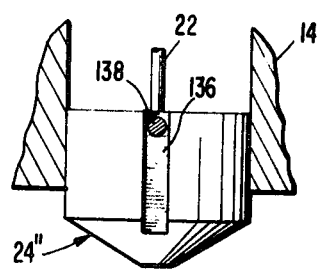

ABSTRACT OF THE DISCLOSURE

An injection apparatus useable for both pre-injection and completing the injection of an anesthetic, and a method of pre-injecting and completing the injection. Pre-injection is accomplished at a high pressure and thereafter the injection is completed at a lower pressure under manual control. Both injection stages utilize a needle. The apparatus also includes a spring loaded plunger movable to inject anesthetic through the needle at a high pressure and further movable for manual injection of anesthetic through the needle at the lower pressure. The needle is adjustable relative to the injector housing for deeper tissue penetration during the low pressure injection.

BACKGROUND OF THE INVENTION

This invention relates to an injection apparatus useable for administering anesthetics. In particular, this invention relates to an injector that makes possible both pre-injection and complete injection with the same apparatus. This invention further relates to a method of pre-injecting an anesthetic at a high pressure and subsequently completing the injection at a lower pressure.

In the administering of anesthetics or the like, particularly in connection with dentistry, it has been common in the past to administer the injection in two steps. The first, or pre-injection step, is generally concerned with the minimization of pain, either by using minimum needle penetration of a conventional injector (having a manually operable plunger), or by using a high pressure needle-less injector with a spring loaded plunger.

In either case, it is desirable, after a sufficient lapse of time in which the pre-injection anesthetic is permitted to take effect, to complete the injection with a conventional injector (having a manually operable plunger) by placing the needle at a greater depth of tissue penetration in order to get maximum desirable diffusion of the medicant. Pain from the second step is either minimal or non-existent as a result of the prior pre-injection step.

While the injection methods and the injectors previously described often prove adequate, they may sometimes be unsatisfactory for a number of reasons. For example, the conventional manually operable injector makes possible the performance of both steps with a single instrument but is not always conducive to minimal pain. This may be attributed to the fact that the anesthetizing fluid enters at a low pressure and relatively slowly, and often is the primary source of pain during the pre-injection step.

Of course, the high pressure needle-less spring loaded injector overcomes this disadvantage since the anesthetic fluid rapidly penetrates the tissue. However, these latter injectors may be unacceptable for complete injection since the diffusion and depth of penetration of the fluid is limited generally to tissue adjacent the surface.

An increase in pressure is not a highly satisfactory solution to the problem insofar as the use of higher pressure may be deleterious to the tissue. Therefore, the conventional manually operable injector is usually required to complete the injection.

Thus, it would be highly desirable to provide an injection method that partakes of the advantages of low pain due to high pressure and high speed injection, while not requiring the use of a separate apparatus to complete the injection. Furthermore, it would be highly desirable to provide a single apparatus that could be used for both pre-injection and complete injection while still minimizing pain.

Both these results are achievable with the present invention, which, in the preferred embodiment comprises an injector having a needle and both high and low pressure injection means hereinafter more fully described.

In the past, injectors have been proposed wherein a needle is ejected into the tissue, while at generally the same time, fluid is injected at high pressures. These injectors, although bearing some structural similarity to the subject invention, are not all concerned with the administering of anesthetics. Furthermore, they may not prove acceptable for accomplishing the objectives of low pain and high fluid diffusion and penetration with a single instrument for at least two reasons.

First, no provision is made for low pressure manual injection subsequent to the high pressure injection.

Secondly, no provision is made for adjusting the needle penetration during needle ejection. This adjustment is significant in oral or facial injections where too great a depth of penetration may stroke bone or be damaging to arteries or the like.

OBJECTS AND SUMMARY OF THE INVENTION

It is, therefore, a general object of the invention to obviate or minimize disadvantages of the sort previously noted.

It is a particular object of the invention to provide an injection apparatus that minimizes pain while providing for maximum desirable and controlled penetration and diffusion of medicant that is injected.

It is still another object of the invention to provide high and low pressure injection apparatus wherein the depth of penetration of the injecting needle is adjustable.

It is a further object of the invention to provide an injection method that provides for both minimization of pain and effective penetration of the medicant.

It is a still further object to provide an injection method that partakes of the advantages of low pain due to high pressure and high speed injection while minimizing the need for using excess equipment to complete an injection.

It is still another object to provide an improved injection apparatus useable for both pre-injection and completing the injection.

A preferred form of the present invention intended to accomplish at least some of the foregoing objects employs injection apparatus comprising an elongated housing with an injector needle mounted therein. A spring biased plunger is used to deliver a predetermined first amount of medicant from a container or ampule to the needle for discharge into the tissue at a substantially high pressure.

The plunger is subsequently further manually operable to inject a second desired amount of medicant from the ampule through the needle and into the tissue at a lower pressure.

In one preferred apparatus and method, the needle is injected into the tissue in response to plunger movement, by about 1 to 3 mm., at substantially the same time that the high pressure injection takes place. Subsequently, the needle may be further extended relative to the casing by a desired amount so that effective and controlled final injection, at a lower pressure and with deeper penetration, is possible. The needle may then be readjusted into its original position relative to the casing.

In another preferred apparatus and method, the needle penetrates the skin during pre-injection in response to engagement of a cap, at the forward end of the housing, with the tissue. The needle here may also be adjusted outwardly by a cam or the like to provide the extension needed for completing the injection.

THE DRAWINGS

Other objects and advantages of the present invention will become apparent from the following detailed description with reference to the accompanying drawings, in which:

FIG. 1 is a generally central longitudinal cross-sectional view of an injection apparatus set for high pressure injection of medicant and substantially simultaneous ejection of the needle;

FIG. 2 is a cross-sectional view of the injection apparatus of FIG. 1, with the elements illustrated, in full line, in their positions subsequent to the high pressure injection, and in phantom, in their positions subsequent to low pressure injection;

FIG. 3 is a cross-sectional view of a portion of the injection apparatus shown in FIG. 1, taken along the line 3—3 therein;

FIG. 4 is a partial cross-sectional view of the mechanism which controls the position of the plunger of the apparatus shown in FIG. 2 and taken along the line 4—4 therein;

FIG. 5 is a generally central longitudinal partial cross-sectional view of an alternative form of an injection needle and housing tip;

FIG. 6 is a generally central longitudinal partial cross-sectional view of an alternative form of a housing tip and means for adjusting the extension of the injection needle with respect thereto;

FIG. 7 is a side elevational view of the extension adjustment means and tip shown in FIG. 6, taken along line 7—7 therein; and FIG. 8 is a side elevational view of the extension adjustment means and tip shown in FIG. 6, taken along line 8—8 therein.

DETAILED DESCRIPTION

Referring now to FIG. 1, a preferred form of the injection apparatus of the present invention is there shown.

The apparatus includes an elongated, generally cylindrical housing or casing 10 having an upper, plunger mounting portion 12 and a lower ampule and needle receiving portion 14 threadably engaged with one another.

Slidably mounted in the upper housing portion 12 is a spring biased plunger 16. This plunger 16 is selectively maintained in an upper, loaded position by a control mechanism 18, mounted on the outer periphery of the upper casing portion 12.

Release of the control means 18 results in downward movement of the plunger 16 against the upper portion of an ampule 20. This ampule is mounted at the upper end of the lower housing portion 14. The wall of this housing portion 14, adjacent the zone of the ampule 20, may be provided with a window (not shown) so that the amount of medicant in the ampule may be conveniently viewed.

The downward movement of the plunger 16, upon release of the control means 18, is operative to substantially simultaneously eject a hollow, tissue penetrating needle 22 from the lower end of the lower housing portion 14, and to cause the ampule 20 to be punctured so as to supply high pressure fluid through the penetrating needle 22. This completes the pre-injection step with the movable elements of the injector coming to rest in the full line positions illustrated in FIG. 2.

To complete the injection, a tip or cap 24 on the lower end of the lower housing portion 14 is inwardly adjusted with respect to the remainder of that housing portion in order to increase the extension of the needle 22 by a desired amount, as illustrated in phantom in FIG. 2. Subsequently, the extended needle 22 is placed deeper into the tissue, and the plunger 16 is manually operated to supply further medicant from the ampule, at a relatively lower pressure, to the needle 22. This completes the final injection step with the movable elements of the injector occupying a position, illustrated in phantom in FIG. 2.

It will be appreciated that the penetration of tissue during the pre-injection step by the ejection of the needle 22 from the housing advantageously minimizes pain because of rapid penetration of the needle as well as rapid injection of the fluid. However, it is not necessary to eject the needle 22 during pre-injection, and, if desired, needle penetration of the tissue during the pre-injection step may be caused by compressive engagement of the housing tip 24 with the tissue instead of by ejection of the needle.

For this purpose, the tip 24 may be provided with an enlarged pocket 26 formed in the terminus thereof. The needle 22 extends into this pocket, and tissue forced into the pocket 26, by compressive engagement with the tip 24, is penetrated by the needle. This compressive engagement of the tip with the tissue may cause a numbing thereof so as to minimize pain caused by needle penetration.

An alternative form of a tip 24' is illustrated in FIG. 5. The terminus of this tip 24' may be generally hollow, as indicated at 28, and the outer wall 30 thereof may be made slightly resilient. Compression of the tip against the tissue results in a slight deformation of the wall 30 so that the penetrating end of the needle is relatively extended through an aperture 32 in the tip thereby to penetrate the tissue.

It will be appreciated that in instances where fluid injection is accomplished by the penetrating needle without ejection thereof, the housing (hereinafter more fully described) for ampule 20 is maintained stationary in the casing 10 during both high and low pressure introduction of fluid into the tissue.

The previously identified plunger 16 includes an elongate, generally cylindrical stem 34 mounted for reciprocation in the upper housing portion 12. This upper housing portion 12 is provided with a closure 36 which is threadably engaged with the upper end of the housing body 38 as indicated at 40.

A central stem receiving aperture 42 extends through the threaded closure 36. This aperture 42 has a diameter substantially equal to that of the plunger stem 34.

Within the upper housing portion 12, and fixedly attached to the stem 34 in any suitable manner, such as by collars 44 and 46, is a spring biased annular piston 48. This piston 48 is provided with an upwardly facing, annular shoulder 50 defining a spring receiving pocket 52. A substantially identical, downwardly facing, annular shoulder 54 and spring receiving pocket 56 are defined on the internal portion of the threaded closure 36.

A coiled compression spring 58 surrounds the stem 34 and bears against the respective upper and lower faces of the piston 48 and threaded closure 36, within the receiving pockets 52 and 56. This spring 58 may be attached to the piston and closure faces in any suitable manner.

As illustrated in FIG. 1, the plunger stem 34 may be moved upwardly with respect to the upper housing portion 12, against the bias of the spring 58, and held in its upper, loaded position, by means of the previously identified control means 18.

This control means 18 includes a mounting bracket 60 attached to the upper housing portion 12 in any suitable manner, as illustrated in FIG. 4. Slidably mounted in the bracket 60, for movement transversely of the axis of the housing 10 is a holding finger 62. This finger 62 is normally biased into the housing through a finger receiving slot 64 in the upper housing wall 38.

This bias of the finger 62 is provided by a spring biased lever 66. The lever 66 is pivotally secured to the bracket 60 by a pivot pin 68 intermediate the lever ends.

One end of the lever 66 comprises a slightly curved, camming finger 70 that extends upwardly, within the bracket, through a central curved slot 72 in the projecting finger 62. At the lower end of the lever, a suitable coil spring 74 may be mounted to bear against the upper housing wall 38 and the lever so as to cause the camming finger 70 to urge the projecting finger 62 inward of the housing.

In this position, the projecting finger 62 may underlie the piston 48 to maintain the plunger 16 in its upper, loaded position by restraining downward movement of the piston 48, as shown in FIG. 1. In this loaded position, a lowermost face of the piston 76 of the plunger stem 34 bears against the upper portion of the ampule 20.

The ampule 20 is mounted within the lower housing portion 14 adjacent the upper end thereof. This upper end is threadably received by the lower end of the upper housing portion 12 as indicated at 78.

When the lower housing portion 14 is detached from the upper housing portion 12, the cylindrical ampule 20 is inserted into an elongated cylindrical bore 80, having a diameter substantially equal to the ampule diameter. This bore 80 is defined by an upwardly projecting, elongate annular shoulder 82 on an annular, needle projection control piston 84. The needle projection control piston 84 is slidably mounted for reciprocation within the lower housing portion 14, between upper and lower shoulder stops 86 and 88.

The upper stop 86 may be conveniently provided by a cylindrical ring 90 having an outer diameter substantially equal to the internal diameter of the upper end of the lower housing portion 14. The needle projection control piston 84 also has substantially the same diameter as the stop 86 and may be inserted into the lower housing portion, after which the ring 90 may be anchored in position within that housing portion by a common friction or an interference fit therewith.

The lower face of the control piston 84 is provided with a downwardly facing, annular projecting shoulder 92, defining a generally cylindrical, spring receiving pocket 94. A suitable coil compression spring 96 bears against, and may be anchored to, the lower piston face within this pocket, to normally urge the piston 84 into engagement with the upper stop 86. A snap ring 99 mounted in an internal groove at the upper end of the lower casing portion 14 may be provided to maintain ring 90 within the casing when the upper stop 86 is so engaged.

The lower end of the spring 96 bears against, and may be anchored to, a fixed annular web 98 adjacent the lower end of the housing portion 14.

Projecting upwardly from the web 98, and integral therewith, is an elongate annular shoulder 100, the upper end of which defines the lower shoulder stop 88. This shoulder 100 also defines a pocket 102 for receiving the lower compression spring 96.

A hollow ampule piercing needle 104 extends centrally of the lower housing portion 14 through the spring receiving pockets 94 and 102, and is surrounded by the lower spring 96. The upper end of the ampule piercing needle 104 is pointed and projects through the control piston 84 and into the ampule receiving bore 80.

This upper end of the needle 104 is anchored to the piston 84 for movement therewith in any suitable manner, such as by an interference fit with an annular locking ring 106. This locking ring 106 is itself interference fit in the bore 80 so as to be fixed to the piston 84. The lower portion of needle 104 slidably extends through a central aperture 108 in the web 98.

On the lower terminus of the needle 104, below the web 98, an enlarged head 110 is mounted. This head frictionally receives the penetrating needle 22 and is preferably made from rubber or the like for ease of attachment of the penetrating needle. It will be appreciated that the enlarged head 110 is centrally apertured to provide fluid communication between the hollow penetrating needle 22 and the piercing needle 104.

To accomplish the high pressure pre-injection with the plunger loaded as shown in FIG. 1, the control lever 66 is pivoted clockwise against the bias of the spring 74. This causes the camming finger 70 to move the holding finger 62 outwardly of the housing by means of engagement with a follower pin 112. This pin 112 forms the outer boundary of the curved slot 72 in the projecting finger (FIG. 4).

It will be appreciated that since the spring force of the upper spring 58 is substantially greater than that of the lower spring 96, initial downward movement of the plunger 16 causes downward movement of the needle ejecting control piston 84 (and therefore the penetrating needle 104 which is fixed to the locking ring 106) until it reaches the lower stop 88 (FIG. 2). This downward movement in turn causes the penetrating needle 22 (previously entirely received within the injector housing 10) to project from the lower end of the housing (FIG. 2).

Although exaggerated in the drawings for purposes of illustration, this projection distance is preferably in the order of 1 to 3 mm., but other maximum distances may be provided for in the design of the lower stop 88. It will also be apparent that within a given desired maximum of needle ejection distances, the penetration distance may be adjusted by moving the injector housing tip outwardly (by unscrewing in the case of FIG. 1) with respect to the lower housing portion. Thus, the penetration of pre-injected fluid is also controllable.

As illustrated at 114, the relationship between the outer diameter of the control piston 84 and the inner diameter of the lower housing portion 14, between the stops 86 and 88, is such that a slight clearance is provided therebetween. This clearance enhances smooth ejection of the needle 22.

Simultaneously with the projection of the penetrating needle 22, the ampule 20 is forced, by the bias of the upper spring 58, to the bottom of the ampule receiving pocket 80, so as to be pierced by the piercing needle 104. The needles are thereby placed in fluid communication with the ampule, and further movement of the plunger 16 under the action of the spring 58 causes high pressure fluid to be injected at the same time as the needle 22 penetrates the tissue.

The lower end of the ampule 20 is provided with a fixed rubber closure 116 to facilitate the penetration by the penetrating needle 104. The upper end of the ampule is closed by an annular piston 118, frictionally fitted within the cylindrical ampule.

When the control means 18 is released, and after both the engagement of the needle ejecting piston 84 with the lower stop 88 and the movement of the ampule to the bottom of the ampule receiving cylinder 80, the force of the upper spring 58 causes further downward movement of the plunger 16. This movement causes the plunger piston 76 and the ampule piston 118 to travel downwardly within the ampule body a given distance to inject fluid through the needles 104 and 22 and into the tissue.

Upon completion of this pre-injection step, the parts of the injection apparatus are in the full line position illustrated in FIG. 2. In this position, the spring 58 is in its substantially relaxed state.

Prior to completing the injection, the penetrating needle 22 is extended a desired distance relative to the lower casing member 14 as illustrated in phantom in FIG. 2. Since the housing tip 24 is threadably received in the lower housing member, as indicated at 120, this extension may be simply accomplished by rotating the tip.

The needle 22 is slidably received in a central aperture 122 in a transversely extending web portion 104a of the tip 24. Also, the upper end of the cap or tip 24 is slotted at 124 for receiving the enlarged head 110 on the piercing needle 104 when the extension adjustment is accomplished. If desired, the cap member 24 may be provided with indicia (not shown) for registering against the lower end of the housing portion 14, which indicia may indicate the amount of relative needle extension. It will be appreciated that the extension of the needle for completing the injection is substantially greater than the extension which is desirable during pre-injection.

Referring now to FIGS. 6 through 8, an alternative form of a needle extension adjustment means is there shown. In this embodiment, the lower end of the lower casing portion 14 is provided with a collar 126, rotatably mounted thereon. A set screw 128, threaded into the collar, extends into a transverse slot 130 in the outer wall of the casing member 14. This set screw is provided with a projecting camming finger 132.

A cap member 24" having a cam slot 134 as illustrated, adjacent the slot 130, is adjustably, slidably received in the lower end of the lower housing member 14. The camming finger 132 of the set screw 128 engages the curved cam groove 134.

Approximately diametrically opposite the upper portion of the cam groove, the cap member 24" is provided with a straight longitudinally extending groove 136, in its outer periphery. A projecting shank 138, extending from a screw 140, cooperates with the straight slot 136 to insure axial translation of the cap in response to rotation of the collar 126. This screw 140 is threadedly received in the side wall of the lower casing portion 14.

As the collar 126 is rotated counterclockwise (as viewed from above in FIG. 6), the set screw 128 moves with the collar and slides within the casing slot 130. Thus the camming finger 132 acts against the curved cam slot 134 to cause the cap to travel inwardly of the lower casing portion 14, thereby to provide relative extensions of the needle 22.

It will be apparent that with the needle extension embodiment of FIGS. 6 through 8, it would not be necessary, during needle extension, to touch portions of the injecting instrument which may come in contact with the patient.

Also, it will be appreciated that the needle extension means of FIGS. 6 through 8 may be employed in connection with the previously identified hollw cap 24' illustrated in FIG. 5.

This cap 24' of FIG. 5 is illustrated as being angled at approximately 30° with respect to the lower casing portion 14, so as to facilitate, for example, oral injections at locations of difficult access. With this arrangement, the needle 22' used with the cap is bent at a similar 30° angle as indicated at 149, so that its egress from the cap will be properly directed.

If desired, the lower end of the angled cap 24' may be suitably universally mounted with respect to the remaining upper portion so as to provide for an angle adjustment. In such instances, the needle egress aperture 32 should be sufficiently large to accommodate for these adjustments.

It will be apparent that the needles of the assemblies shown in FIG. 5 and FIGS. 6 through 8 may either be spring ejected for preinjection with apparatus such as that shown in FIG. 1, or may be stationary during the pre-injection step.

Also, the needle egress aperture 144 of the cap 24" illustrated in FIGS. 6 through 8 may be enlarged so that if the needle is not ejected during pre-injection, the engagement of the tip 24" with the tissue will cause the tissue to be compressed into the aperture for penetration by the needle.

Referring now to FIG. 3, a cross-section of the upper casing portion 12, adjacent the location in which the spring biased piston 48 comes to rest upon completion of the pre-injection step is there shown. At this location, the upper casing member 12 is provided with an internal annular groove 146. A resilient split ring 148 is seated in the groove, and in its relaxed state, the ring projects inwardly of the casing wall 38. The piston 48 tends to come to rest adjacent the ring 146 at the end of a pre-injection step (FIG. 2).

The ring 148 does not actually prevent further downward travel of the piston, but merely is intended to dampen any vibrations of the piston 48 that may be induced by the shock of the abutment between the needle ejecting control piston 84 with the lower stop member 88.

The injection is completed, after adjustment of the injector tip by manual depression of the plunger 16. This depression is facilitated by engagement of a finger with a finger rest 150 at the upper end of the plunger. It will be appreciated that capillary action prevents loss of fluid from the ampule between pre-injection and complete injection.

The split ring 148 expands into its groove seat 146, to permit the piston 48 to pass. It will be apparent that the pressure of fluid injected during final injection may be entirely manually controlled and is substantially less than the fluid pressure in pre-injection.

The diameter of the piston 48 is approximately equal to the internal diameter of the upper casing member 12. However, the outer periphery of this piston member is chamfered or tapered on the upper and lower edges as indicated at 152 and 154.

When the injector is to be reloaded for pre-injection, the upper chamfered surface 154 engages an inclined lower surface 156 on the finger projection 62 to permit retraction of the piston 48.

The lower chamfered surface 152 minimizes the possibility of snagging of the piston 48 when the lever 66 is activated to provide for preinjection.

It will be apparent that the selection of the spring forces for the spring members 58 and 96 (and the design of the permissible downward travel of the needle ejecting piston 84 when needle ejection is employed) provides a control over the amount of fluid pre-injected with a given ampule size for the ampule 20. These spring forces may be varied for desired purposes.

When an ampule is to be replaced, the lower casing member 14 which is threadedly received by the upper casing member is unscrewed.

It is contemplated that a suitable conventional check valve (not shown) may be suitably placed in the fluid exit line, such as in the head 110 of the ampule piercing needle 104, to provide for repeating the pre-injection step. In such instances, the upper loaded spring 58 would not be in its fully extended position after the first pre-injection step. However, continued downward movement of the plunger 16, as a result of spring force, would be prevented insofar as the pressure responsive valve would prevent exit of more than a predetermined amount of medicant from the ampule 20, due to the increased pressure of the fluid within the ampule.

Of course, with the apparatus illustrated in FIGS. 1 and 2, if the injector were reset for pre-injection the penetrating needle 22 would be withdrawn back into the tip 24 by action of the lower spring 96. If such withdrawal is not desired, a suitable locking member (not shown) may be selectively inserted through the lower casing wall 14 to lock the lower, needle ejecting piston 94 in extended position.

Thus, it may be seen that in following the present invention an improved injection apparatus and method which provides for both minimization of pain and effective penetration of the medicant is available.

Particularly significant is the ability to adjust the depth of penetration of the injection needle prior to completion of the injection. Also of importance is the fact that the needle may be injected at the same time as the medicant during the pre-injection step so as to minimize apprehension on the part of the patient.

Furthermore, the depth of penetration of the injection needle, and therefore, the depth of fluid penetration may be controlled during pre-injection by adjustment of the injector cap.

Moreover, the apparatus and method of the present invention enables the use of high pressure and high speed injection without necessitating transfer to a separate apparatus to complete the injection.

Although the invention has been described with reference to particular preferred embodiments and methods, additions, not specifically described, as well as modifications, substitutions and deletions will occur to those skilled in the art, which fall within the spirit of the invention.

What is claimed is:

1. Injection apparatus for pre-injection and complete injection of medicant from a medicant container and into tissue, the apparatus comprising:
   an elongated casing for receiving the medicant container therewithin,
   a hollow needle mounted at least partially within said casing, said needle having a first end for penetrating tissue and a second end for receiving a medicant from the medicant container,
   injection means for introducing medicant from the medicant container into said second end of said needle to be discharged through said first end of said needle,
   said injection means including
   first means for initially introducing at least a first portion of the medicant into said second end of said needle and discharging said first portion through said first end of said needle and into the tissue at a first pressure, and
   second, manually controlled means, operable after operation of said first means for initially introducing at least a first portion of the medicant, for subsequently and under manual control introducing at least a second portion of the medicant into said second end of said needle and discharging said second portion through said first end of said needle and into the tissue at a second pressure, said first pressure being substantially higher than said second pressure.

2. Injection apparatus according to claim 1 wherein:
   said means for initially introducing and discharging at least a first portion of the medicant includes
   a plunger mounted for translation in said casing and cooperable with the medicant container to discharge medicant therefrom, and
   means for releasably spring loading said plunger for movement by a first amount, and
   said means for subsequently introducing and discharging at least a second portion of the medicant includes both said plunger and manually engageable means for moving said plunger by a further amount.

3. Injection apparatus according to claim 1 including:
   means mounting said needle in an initial position wholly within said casing prior to injection, and
   means for ejectng said first end of said needle out of said casing by a first distance and into the tissue at a first depth, while initially introducing and discharging the first portion of the medicant.

4. Injection apparatus according to claim 3 including:
   means for selectively and relatively moving said first end of said needle with respect to one end of said casing so that said first end projects from said casing by a second distance, said second distance being greater than said first distance.

5. Injection apparatus according to claim 1 including:
   means mounting said needle in an initial position wholly within said casing prior to injection, and
   compresson means on one end of said casing and engageable with the tissue for causing said needle to penetrate the tissue.

6. Injection apparatus according to claim 5 including: means for selectively and relatively moving said first end of said needle with respect to one end of said casing.

7. Injection apparatus according to claim 1 including:
   means for selectively and relatively moving said first end of said needle with respect to one end of said casing.

8. A method for pre-injecting medicant from a medicant container and into tissue and subsequently completing the injection, the method comprising:
   injecting a first portion of the medicant into the tissue at a first pressure with an injection apparatus, and
   thereafter in an operation subsequent to the injection of medicant into the tissue at a first pressure, injecting, under manual control, a further portion of the medicant into the tissue at a second pressure with the same injection apparatus, said first pressure being substantially higher than said second pressure.

9. A method of pre-injecting medicant and subsequently completing the injection, the method comprising:
   injecting, using a needle to penetrate the tissue, a first portion of medicant at a first pressure, and
   thereafter in an operation subsequent to the injection of medicant at a first pressure, injecting, using a needle to penetrate the tissue, a second portion of medicant at a second pressure, said first pressure being substantially higher than said second pressure.

10. Injection apparatus for injection of medicant from a medicant container and into tissue, the apparatus comprising:
    means, including a tissue penetrating needle, for injecting medicant from the medicant container and into the tissue at a first pressure, and
    means, including said needle and operable after operation of said means for injecting medicant at a first pressure, for injecting medicant from the medicant container under manual control and into the tissue at a second pressure, said first pressure being substantially higher than said second pressure.

11. Injection apparatus according to claim 10 including:
    means for causing said needle to penetrate the tissue while introducing the medicant into the tissue at said first pressure.

12. Injection apparatus according to claim 11 including:
    a casing for mounting said needle and for receiving the medicant container, and
    means for selectively and relatively moving said needle with respect to the end of said casing so that said needle projects from said casing.

13. Injection apparatus according to claim 10 wherein:
    said means for injecting medicant into the tissue at a first pressure includes a plunger cooperable with the medicant container to discharge medicant therefrom, and means for spring loading said plunger for movement by a first amount, and
    said means for injecting medicant into the tissue at a second pressure includes said plunger and manually engageable means for moving said plunger by a second amount.

14. A method of pre-injecting medicant into tissue and subsequently completing the injection, the method comprising:
    automatically injection, using a needle to penetrate the tissue, a portion of the medicant at a first pressure,
    and subsequently manually injecting, using said needle to penetrate the tissue, a further portion of the medicant at a second pressure, said first pressure being substantially higher than said second pressure.

15. Injection apparatus for injection of medicant from a medicant container and into tissue, the apparatus comprising:
    means, including a tissue penetrating needle, a movable plunger engageable with the medicant container, and means for releasably spring loading said plunger, for injecting medicant from the medicant container and into the tissue at a first pressure upon movement of said plunger, and means, including each of said needle, said plunger, and manually engageable means for thereafter further moving said plunger, for injecting medicant from the medicant container and into the tissue at a second pressure, said first pressure being substantially higher than said second pressure.

References Cited

UNITED STATES PATENTS

| | | | |
|---|---|---|---|
| 2,664,086 | 12/1953 | Transve | 128—218(2) |
| 2,762,370 | 9/1956 | Venditty | 128—173(H) |
| 2,847,995 | 8/1958 | Adams | 128—218(N)UX |
| 3,073,306 | 1/1963 | Linder | 128—215 |
| 3,306,290 | 2/1967 | Weltman | 128—215UX |

FOREIGN PATENTS

| | | | |
|---|---|---|---|
| 1,538,565 | 7/1968 | France | 128—218 |
| 1,008,915 | 11/1965 | Great Britain | 128—218 |

JOSEPH S. REICH, Primary Examiner

U.S. Cl. X.R.

128—215